(12) United States Patent
Souma et al.

(10) Patent No.: US 11,701,848 B2
(45) Date of Patent: Jul. 18, 2023

(54) POLARIZABLE COMPACT

(71) Applicants: TOKAI SEIMITSU INDUSTRIAL CO., LTD., Toyokawa (JP); NAKANISHI OPTICAL PRODUCTS CORP., Osaka (JP)

(72) Inventors: Norihito Souma, Toyokawa (JP); Keiichi Nakanishi, Osaka (JP)

(73) Assignees: TOKAI SEIMITSU INDUSTRIAL CO., LTD., Toyokawa (JP); NAKANISHI OPTICAL PRODUCTS CORP., Osaka (JP)

( * ) Notice: Subject to any disclaimer, the term of this patent is extended or adjusted under 35 U.S.C. 154(b) by 563 days.

(21) Appl. No.: 16/823,380

(22) Filed: Mar. 19, 2020

(65) Prior Publication Data

US 2020/0218090 A1    Jul. 9, 2020

Related U.S. Application Data

(62) Division of application No. 15/742,657, filed as application No. PCT/JP2016/067876 on Jun. 16, 2016, now abandoned.

(30) Foreign Application Priority Data

Jul. 16, 2015    (JP) ................. 2015-142384

(51) Int. Cl.
*B29D 11/00*  (2006.01)
*G02B 5/30*  (2006.01)
(Continued)

(52) U.S. Cl.
CPC .... *B29D 11/00644* (2013.01); *B29C 45/0001* (2013.01); *B29C 45/73* (2013.01);
(Continued)

(58) Field of Classification Search
CPC .......... B29D 11/00644; B29D 11/0073; B29C 45/0001; B29C 45/73; B29C 65/02;
(Continued)

(56) References Cited

U.S. PATENT DOCUMENTS 3,968,309 A * 7/1976 Matsuo ................... C08J 7/043
522/182
4,387,133 A   6/1983 Ichikawa et al.
(Continued)

FOREIGN PATENT DOCUMENTS

EP    1217397 A2    6/2002
EP    1804088 A2    7/2007
(Continued)

OTHER PUBLICATIONS

International Search Report dated Sep. 20, 2016, issued for PCT/JP2016/067876.
(Continued)

*Primary Examiner* — Mathieu D Vargot
(74) *Attorney, Agent, or Firm* — Locke Lord LLP

(57) ABSTRACT

A polarizable compact is provided with high productivity, which makes a polarizing sheet resistant to the occurrence of color unevenness and voids and also resistant to the occurrence of variations in polarization degree accompanying thermal shrinkage and the like of a protective layer (protective film). A polarizable compact is used for glasses, and a method of manufacturing the same. An injection-molded portion made of a transparent plastic material is thermally bonded to the concave surface side of a polarizing sheet having a predetermined curvature radius. The polarizing sheet has a polarizer layer held between first and second protective layers respectively serving as a convex surface side and a concave surface side. Both the first and second protective layers are formed from transparent films by a
(Continued)

POLARIZABLE COMPACT 10 casting method with retardation (Re)≤50 nm. The transparent films for the first and second protective layers are respectively formed from an acylcellulose-based film and a polyamide-based film.

19 Claims, 1 Drawing Sheet

(51) Int. Cl.
| | |
|---|---|
| B29C 45/00 | (2006.01) |
| B29C 65/02 | (2006.01) |
| B29C 45/73 | (2006.01) |
| B29C 53/04 | (2006.01) |
| G02C 7/12 | (2006.01) |
| G02B 1/14 | (2015.01) |
| G02B 1/04 | (2006.01) |
| B29K 77/00 | (2006.01) |
| B29K 601/00 | (2006.01) |
| B29K 677/00 | (2006.01) |

(52) U.S. Cl.
CPC .............. *B29C 53/04* (2013.01); *B29C 65/02* (2013.01); *B29D 11/0073* (2013.01); *G02B 1/041* (2013.01); *G02B 1/14* (2015.01); *G02B 5/30* (2013.01); *G02C 7/12* (2013.01); *B29K 2077/00* (2013.01); *B29K 2601/08* (2013.01); *B29K 2677/00* (2013.01); *G02C 2202/16* (2013.01)

(58) Field of Classification Search
CPC .. B29C 53/04; G02C 7/12; G02B 5/30; G02B 1/14; G02B 1/041
See application file for complete search history.

(56) References Cited

U.S. PATENT DOCUMENTS

| | | | |
|---|---|---|---|
| 6,165,392 | A | 12/2000 | Kobuchi et al. |
| 2002/0044352 | A1 | 4/2002 | Yamamoto et al. |
| 2002/0084023 | A1 | 7/2002 | Yamamoto et al. |
| 2004/0105072 | A1 | 6/2004 | Qin et al. |
| 2007/0148482 | A1 | 6/2007 | Fujinaka et al. |
| 2008/0094707 | A1 | 4/2008 | Tsukane et al. |
| 2009/0086320 | A1* | 4/2009 | Yoshihara ................ G02B 1/14 359/615 |
| 2011/0205627 | A1 | 8/2011 | Kobuchi et al. |

FOREIGN PATENT DOCUMENTS

| | | |
|---|---|---|
| EP | 2362249 A2 | 8/2011 |
| JP | 11-245259 A | 9/1999 |
| JP | 2002-189199 A | 7/2002 |
| JP | 2006/227591 A | 8/2006 |
| JP | 2011-180266 A | 9/2011 |
| WO | 2006/040954 A1 | 4/2006 |

OTHER PUBLICATIONS

Extended European Search Report dated Jan. 25, 2019, issued for the European Patent Application No. 16824198.2.
Communication dated Jul. 27, 2022, issued for Europeant Patent Application No. 16 824 198.2.
Anonymous: "Molding Temperature | Nylon-MXD6 | Products | Mitsubishi Gas Chemical Company, Inc.", Mitsubishi Gas Chemical Company, Inc Home Page, Jul. 19, 2022, pp. 1-2. (cited in the Jul. 27, 2022 Communication issued for EP16 824 198.2).

* cited by examiner

⇩ INVERSION

POLARIZABLE COMPACT

This Application is a Division of U.S. application Ser. No. 15/742,657 filed on Jan. 8, 2018, which is a National Stage Entry of PCT Application No. PCT/JP2016/067876 filed on Jun. 16, 2016, which claims priority from Japanese Application No. 2015-142384 filed on Jul. 16, 2015 in Japan. The entire contents of these applications are incorporated herein by reference in their entirety.

TECHNICAL FIELD

The present invention relates to a polarizable compact that is formed by thermally bonding an injection-molded portion made of a thermoplastic resin to the concave surface side of a polarizing sheet with a curvature and used for glasses. The present invention relates, in particular, to a polarizable compact that makes a polarizing sheet resistant to the occurrence of variations in polarization performance, has an excellent polarization property, has a light weight, provides clear vision, and is suitable as a material for goggles and sunglasses.

The technical terms used in this specification have the following meanings.

<Abbe Number (ν)>

$$\nu = (nd-1)/(nF-nC)$$

where ν (Abbe number) is the reciprocal of dispersion, nd is a refractive index with respect to 587.6 nm light, nF is a refractive index with respect to 486.1 nm light, and nC is a refractive index with respect to 656.3 nm light.

<Retardation Value (Re)>

A retardation value is defined by Re (nm)=Δn·d, and is a value with respect to a wavelength of 632.8 nm. Note that Re is measured vertically and horizontally and the arithmetic mean of vertical and horizontal measurements in the present invention.

In this case, Δn means a birefringence amount and is given by Δn=ne−no (where ne is a refractive index with respect to an ordinary beam and no is a refractive index with respect to an abnormal beam), and d is defined by a film thickness.

BACKGROUND ART

The citation list associated with the above polarizable compact includes, for example, Patent Literatures 1 to 3.

Paragraphs 0002 to 0008 in Patent Literature 1 will be cited next.

"TECHNICAL FIELD OF THE INVENTION

The present invention relates to a technique of providing a polarizable compact incorporating a polarizer and having high shock strength, for example, a lens base material used for goggles, sunglasses, and prescription sunglasses with high shock strength.

PRIOR ART

Goggles, glasses, and the like are used in the field of sports including skiing, snowboarding, ice skating, sailboating, boating, biking, and motorbiking, the industrial fields including manufacturing industries in general and civil engineering and construction for the purposes of reducing glare caused by direct light, reflected light, and the like and protecting the eyes from wind, snow, rain, seawater, water, sand, chemicals, foreign substances, and the like. In addition, general-purpose sunglasses and prescription sunglasses are used to reduce glare caused by light beams and reflected light.

Conventionally, there have been available a polarizable glass lens formed by covering both surfaces of a polarizer sheet with glass and a polarizable plastic lens formed by cast molding by inserting a polarizer sheet into a mold, for example, polarizable CR-39 lens.

There is also known an optical composite molded product formed by inserting, into a mold, a polarizing plate having a multilayer structure with a polarizer sheet being held between two polycarbonate sheets, and further performing insert injection molding to thermally bond a polycarbonate resin layer to a polycarbonate sheet (JP No. 8-52817A).

Problem to be Solved by the Invention

The polarizable glass sheet, with both surfaces of the polarizer sheet being covered with glass, is fragile because of being a glass base material and lacks workability because of the base material being difficult to deform.

The polarizable plastic lens obtained by cast molding by inserting a polarizer sheet into a mold, has problems in that high skill is required for casting a polarizer sheet into a mold and the polarization performance deteriorates due to shrinkage and thermal decomposition of a polarizer sheet which are caused by heat received for a long period of time during cast molding.

Furthermore, the optical composite molded product obtained by performing insert injection molding so as to thermally bond a polycarbonate resin layer to a polycarbonate sheet which is the outermost layer of a polarizing plate, as disclosed in JP No. 8-52817A, has a problem in that the polarization performance deteriorates due to shrinkage and thermal decomposition of the polarizer sheet as in cast molding because the polarizing plate and the resin layer are so close that heat at the time of molding is transmitted directly to the polarizing plate.

Means for Solving the Problem

The technical means according to the present invention which solves the above technical problems is a polarizable compact with a multilayer structure including a polarizing plate having a polarizer sheet layer held between two protective sheets, with one layer of the protective sheet layer being bonded to a polyurethane sheet layer or a polyamide sheet layer with a bonding agent or adhesive agent, and the polyurethane sheet layer or the polyamide sheet layer being thermally bonded to the thermoforming resin layer."

According to the method proposed by Patent Literature 1, however, the polyamide sheet layer needs to be joined to the triacetylcellulose (TAC) layer serving as the concave surface side of the polarizing sheet (polarizer sheet) with a bonding agent or the like, resulting in an increase in the number of manufacturing steps (a deterioration in productivity). In addition, the polarizable complex (optical composite molded product) tends to have a thickness larger than that of a conventional polarizing sheet (polarizer sheet), deteriorates in bending workability, and has difficulty in meeting demand for thinner polarizable compacts (lenses).

It is therefore considered, in order to solve the above problems, to use the polarizable sheet (polarizing sheet) described in Patent Literature 2 [paragraphs 0056 to 0070] and the like "a composite multilayer body obtained by forming a protective film using a polyamide-based resin such as a specific alicyclic polyamide resin" and to also use the technique for the polarizable compact described in the same patent literature [paragraphs 0072 to 0077] "manufacturing a polarizable multilayer body (polarizable compact) by insert injection molding, on the concave surface side of the polarizable sheet (polarizing sheet), using a resin akin or identical to that of the protective film layer (a polyamide-based resin such as an alicyclic polyamide resin)."

As described in the same patent literature [paragraph 0039], the polyamide resin of the polarizable sheet according to this technique, has a higher Abbe number than a polycarbonate resin. This efficiently prevents the occurrence of rainbow color unevenness. However, in order to prevent voids after a bending process, orientation (stretching process) is required (resulting in an increase in the number of manufacturing steps) so as to make the polyamide protective film (before the bending process) have a retardation value (Re) equal to or more than a specific value (300 nm). Note that the protective film is made to have Re "equal to or more than 300 nm" in order to prevent the occurrence of voids by preventing Re from increasing due to the bending process and exceeding upper limit Re (400 nm) for the occurrence of voids (voiding) (the same patent literature [paragraphs 0012 and 0046]).

As in Examples described in the same patent literature [Table 1], a protective film made of a polyamide resin generally has undergone a stretching process at a high magnification (1.06× to 3.0×; "1.0" in Example 3 is considered to be an error in writing), and hence is susceptible to thermal shrinkage at the time of injection molding. Incident light reaching the polarizer layer through the first protective layer, in particular, is slightly polarized with an increase in birefringence amount. For this reason, when the first protective layer has undergone a stretching process, the polarization performance (including a polarization degree) of the polarizing sheet is considered likely to vary as compared with a case in which the first protective layer is formed by a casting method (see Patent Literature 1 [paragraph 0028]).

Patent Literature 3 proposes various types of molds for insert injection molding of polarizable compacts (see [paragraphs 0002 to 0006], [paragraphs 0008 and 0009], and [FIG. 1]).

CITATION LIST

Patent Literature

Patent Literature 1: JP No. 2002-189199A
Patent Literature 2: WO2006/040954A
Patent Literature 3: JP No. 11-245259A

SUMMARY OF INVENTION

Technical Problem

The present invention has been made in consideration of the above problems, and has as its object to provide a polarizable compact, with high productivity, which makes a polarizing sheet resistant to the occurrence of color unevenness and voids and also resistant to the occurrence of variations in polarization degree accompanying thermal shrinkage and the like of a protective layer (protective film).

Solution to Problem

In order to solve the above problems, the present inventors have made an intensive effort toward development and arrived at a polarizable compact having the following arrangement.

A polarizable compact used for glasses is characterized in that an injection-molded portion formed from a transparent molding material is thermally bonded to a concave surface side of a polarizing sheet having a predetermined curvature radius, the polarizing sheet having a polarizer layer held between a first protective layer and a second protective layer respectively serving as a convex surface side and a concave surface side, the first protective layer and the second protective layer are formed from transparent films by a casting method with retardation (Re)≤50 nm, the transparent films of the first protective layer and the second protective layer being formed from an acylcellulose-based plastic film material and a polyamide-based plastic film material, respectively, and the second protective layer is directly fused to the injection-molded portion.

Advantageous Effects of Invention

A polarizable compact according to the present invention is resistant to the occurrence of color unevenness and voids as described in the following Examples.

In addition, using a transparent film for first and second protective layers, each having an extremely small retardation value (Re) (that is, a relatively small birefringence amount) without stretching and orientation will make a protective film resistant to thermal shrinkage in one direction due to thermal influences at the time of injection molding and reduce a rejection rate.

Furthermore, actively using an acylcellulose-based transparent film with a high Abbe number (v) (low dispersion) as a first protective layer makes it less likely to cause color unevenness. In addition, extremely reducing Re (birefringence amount) makes it much less likely to cause variations in polarization performance (including polarization degree).

DESCRIPTION OF EMBODIMENTS

Figure 1A:
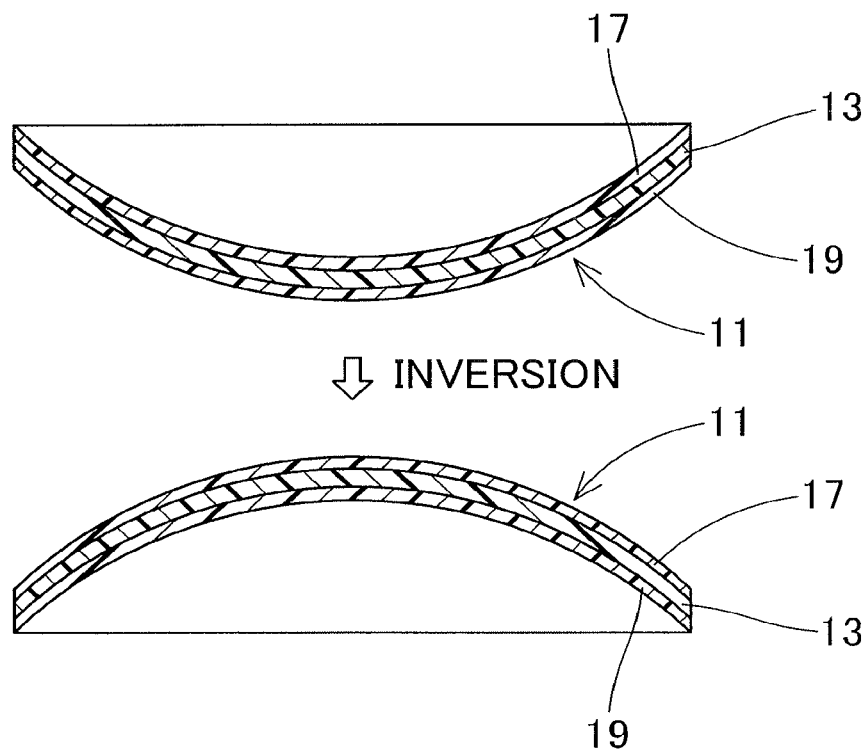
FIG. 1A is a sectional view showing a step of inverting a polarizing sheet according to the present invention.
Figure 1B:
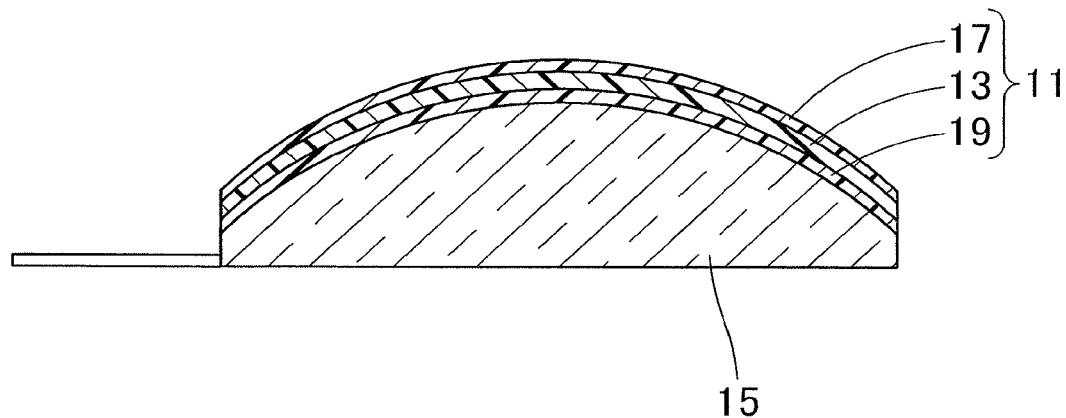
FIG. 1B is a sectional view of a polarizable compact according to the present invention.

A preferred embodiment of the present invention will be described below.

A polarizable compact 10 according to the present invention is used for glasses and formed by thermally bonding an injection-molded portion 15 made of a transparent molding material to the concave surface side of a polarizing sheet 11 with a predetermined curvature radius. The polarizing sheet 11 has a polarizer layer (polarizer film) 13 held between first and second protective layers (protective films) 17 and 19 respectively serving as a convex surface side and a concave surface side.

That is, the polarizable compact 10 according to the present invention is obtained by omitting the polyamide sheet layer interposed between the polarizing sheet and the injection-molded portion while replacing the TAC-based transparent film forming the second protective layer of the polarizing sheet with a polyamide-based film material in Patent Literature 1, and directly fusing the injection-molded portion 15 made of a transparent molding material to the second protective layer 19 on the concave surface side. A preferred embodiment of the present invention will be described below while citing part of the description in Patent Literature 1. The term "Literature" in the following description indicates "Patent Literature" unless otherwise specified.

The polarizing sheet 11 has the polarizer layer 13 held between the first and second protective layers 17 and 19 respectively serving as the convex surface side and the concave surface side.

In this case, as the polarizer layer 13, a layer described in Literature 1 [paragraphs 0020 to 0022] can be used. That is, this layer is formed from a polarizer film with a polarization degree of 80% or more, preferably 90% or more, and more preferably 99% or more, obtained by doping a uniaxially stretched film such as a polyvinyl alcohol (PVA) film as needed.

The first and second protective layers 17 and 19 are respectively formed from a transparent film made of an acylcellulose-based film material and a polyamide-based film material, each having a retardation value (Re)≤50 nm, preferably Re≤10 nm, and more preferably Re≤5 nm.

In this case, the reason why each film has "Re≤50 nm" is that even if a bending process increases Re, Re does not easily reach lower limit Re "150 nm" at which no void occurs in a polarizing sheet (protective layer) (Literature 2 [paragraphs 0012 and 0046]). Although Comparative Example 1 in [Table 1] of Literature 2 described above shows a case in which Re after a bending process increases by 20 times, this protective layer is an inductile extruded film (having an orientation), which cannot be compared with a casted film according to the present invention in the same context.

Using the first and second protective layers 17 and 19 exhibiting Re≤50 nm makes it less likely to cause variations in the polarization performance (polarization degree) of the polarizing sheet 11. This is considered to be because light reaches the polarizer layer 13 through the first protective layer 17 without, for example, being polarized owing to small Re (a relatively small birefringence amount), and the second protective layer 19 located inside is almost free from thermal shrinkage caused by thermal influences in forming an injection-molded portion described later.

Obviously, as Re decreases, the film thickness (d) becomes relatively small. This makes a bending process less likely to cause voids, and makes it less likely to cause variations in polarization performance.

For this reason, the polarizing sheet 11 preferably has Re≤50 nm, and more preferably Re≤10 nm, after a bending process.

In this case, the first protective layer 17 is preferably formed from a transparent film with Re≤10 nm so as to have smaller Re than the second protective layer 19. If the first protective layer 17 has large Re, incident light reaching the polarizer layer 13 through the first protective layer 17 is slightly polarized. This may cause variations in the polarization performance of the polarizer layer 13. In addition, since the first protective layer 17 is located on the surface side, voids and the like are noticeable, if any.

In order to reduce Re of the first and second protective layers 17 and 19, transparent films obtained by a casting method are generally used without any stretching process.

In addition, film materials for transparent films forming the first and second protective layers 17 and 19 exhibit Abbe number (ν)≥44, and more preferably ν≥50 (the most preferable range in Literature 2 [paragraph 0039]). The film material (acylcellulose-based material) for the first protective layer 17, in particular, preferably exhibits ν≥54, which is higher than that of the film material (polyamide-based material) for the second protective layer 19 (the most preferable range in Literature 2 [paragraph 0039]). Forming the first protective layer 17 using a film material with a high Abbe number (low dispersion) makes it less likely to cause rainbow color unevenness when externally viewed. In addition, a high Abbe number and extremely small Re can make it much less likely to cause variations in the polarization performance of the polarizing sheet. Furthermore, color unevenness becomes less likely to occur as a whole.

As a film material for the first protective layer 17, which is not specifically limited, any acylcellulose-based film that can satisfy the above requirements may be used. In consideration of the prevention of color unevenness, in particular, it is preferable to use triacetylcellulose (TAC) that can easily obtain a film material with ν 54 and is widely used as a polarizing sheet (Literature 2 [paragraph 0039]).

The second protective layer 19 is directly fused to the injection-molded portion 15. As a transparent molding material for the injection-molded portion 15, it is preferable to use the same polyamide-based material as the film material for the second protective layer 19. This material is less likely to produce fusion lines, and has a high Abbe number as described above. In addition, the material can prevent the occurrence of color unevenness and is less likely to cause poor appearance due to color unevenness even when the polarizable compact is viewed from its concave surface side. Furthermore, as will be described later, the above material allows the selection of a low-density material, and hence is preferable.

In this case, as shown in FIG. 1A, the polarizing sheet 11 is generally formed into a spherical shape by a bending process (thermal press forming) with the first protective layer 17 made of an acylcellulose-based film material being located inside, and the second protective layer 19 made of a transparent polyamide-based film material being located outside, and the resultant structure is inverted when used. After a bending process, the resultant structure is generally subjected to an annealing process (slowly cooled after being heated to just below the thermal deformation temperature) to remove internal stress in consideration of dimensional stability and the like. In this case, if a transparent polyamide film or the like is located inside, the transparent film as the second protective layer 19, which is made of a polyamide-based film material, undergoes thermal shrinkage. This matches the description in Literature 1 [28th to 35th lines in column 18], which describes a case in which a polarizing composite sheet is inverted after a bending process when used.

As a polyamide-based film material for the second protective layer 19, a material called amorphous or microcrystalline nylon can be generally used. For example, the material described in Literature 2 [paragraph 0026] can be used. The alicyclic polyamide (alicyclic PA) represented by formula (1), in particular, can be suitably used because it is excellent in transparency and chemical resistance. Obviously, because this material is used for glasses, it has an optical transmittance of 80% or more, preferably 85% or more, and more preferably 90% or more.

[Chemical formula 1]

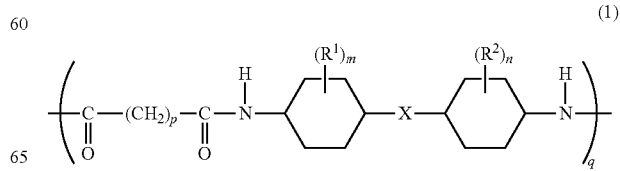

(1)

(where X represents a directly bonded alkylene group or alkenylene group, R1 and R2 represent identical or different alkyl groups, m and n represent integers from 1 to 4, and p and q represent integers equal to or more than 1).

In the above case, a material exhibiting p=8 to 12 has flexibility and is excellent in shock resistance, and hence is preferable.

Among the above alicyclic PA, a material having the following properties is preferable as a transparent molding material and, by extension, a film material.

In terms of weight saving, the material to be used has a density (ISO1183) of 1.03 g/cm$^3$ or less, preferably 1.02 g/cm$^3$ or less, and more preferably 1.01 g/cm$^3$ or less.

In terms of shock resistance/crack resistance, the material to be used has a tensile elastic modulus (ISO527) of 1400 mPa to 2000 mPa, and preferably 1500 mPa to 1800 mPa. Excessively high rigidity makes it difficult to obtain shock resistance, whereas excessively low rigidity makes it difficult to secure strength required for glasses.

In terms of heat resistance, the material to be used has a glass transition point (Ser. No. 16/011,367) of 140° C. to 200° C., and preferably 130° C. to 160° C.

It is possible to select a transparent polyamide exhibiting these properties from Grilamid (registered tradename) available from EMS-CHEMIE (Japan) Ltd. and Torogamid (registered tradename) available from Daicel Evonik Ltd.

Table 1 shows the main desired properties of "Grilamid TR90" and "Torogamid CX7323" of the materials cited as the above transparent polyamides from Patent Literature 1, which are cited from catalogs of products of the respective companies.

TABLE 1

| Properties | | Unit | Grilamid TR90 | Torogamid CX7323 |
| --- | --- | --- | --- | --- |
| Density (23° C.) | ISO1183 | g/cm$^3$ | 1.00 | 1.02 |
| Tensile Elastic Modulus | ISO527 | MPa | 1600 | 1500 |
| Heat Distortion Temperature | ISO075(1.8 Mpa) | ° C. | 115 | 105 |
| Optical Transmittance | 550 nm, 3 mm | % | 90 | 90 |

These films are then stacked and formed into a polarizing sheet having a three-layer structure by a conventional method using a bonding agent or adhesive agent (see, for example, Literature 1 [paragraphs 0034 to 0037]).

The respective layers have the following thicknesses: the first protective layer (if TAC): 50 μm to 110 μm (preferably 60 μm to 100 μm); the polarizer layer (if PVA): 10 μm to 50 μm (preferably 20 μm to 40 μm); and the second protective layer (alicyclic polyamide): 80 μm to 120 μm (preferably 90 μm to 110 μm). These layers are preferably as thin as possible in terms of weight saving and Re within a range in which each function and film deposition property are not impaired.

Note that the above polarizing sheets are produced and distributed by companies such as Sumitomo Bakelite Co., Ltd., Mitsubishi Gas Chemical Company, Inc., and Polatechno Co., Ltd. Even if a polarizing sheet satisfying set specifications is not commercially available from the above companies, such polarizing sheet can be easily obtained by designating the specifications of the polarizing sheet to such company.

The polarizing sheet prepared in the above manner is thermoformed (a bending process) into one having a predetermined curvature by a conventional method. In this case, in general, a curvature is properly selected from the range of 4 C to 8 C. Note that a curvature was calculated at a refractive index of 1.534 for the sake of convenience. Accordingly, 4 C is 133.62 mm, 6 C is 89.08 mm, and 8 C is 66.81 mm.

In this case, Re of the polarizing sheet (three layers) after a bending process is preferably set to Re≤50 in consideration of visibility and the like.

The polarizing sheet bent into a spherical shape is then set in a mold after being inverted as described above, and an injection-molded portion is formed by insert injection molding or the like by using a transparent molding material. Injection molding allows demolding in a very short time (within 2 min after injection), and hence makes the polarizing sheet less likely to receive thermal influences.

In this case, a transparent molding material to be used, although not specifically limited, is preferably a polyamide-based transparent molding material that is identical or akin to a polyamide-based film material for the second protective layer and has a low density because of high fusibility as long as it can be thermally fused to the second protective layer. That is, this material is a polyamide-based transparent molding material with an Abbe number satisfying ν≥44, and preferably ν≥50, and a density (ISO1183) of 1.03 g/cm$^3$ or less, preferably 1.02 g/cm$^3$, and more preferably 1.01 g/cm$^3$.

The resin material injection temperature of a transparent molding material is set to 230° C. to 270° C. in the case of the above alicyclic polyamide resin, although it varies depending on the grades of polyamides. In addition, the mold temperature is set to 60° C. to 100° C.

In this case, an injection mold to be used can be properly selected from conventional molds (generally, 4- to 8-cavity molds) like those described in Literature 3.

In addition, because a polarizable compact according to the present invention is used for glasses, the obverse surface side (object side) is generally covered with a hard coat film through a primer film, and also the reverse surface side (eyeball side) is covered with a hard coat film through a primer film, as needed, as in the prior art. In addition, each hard coat film is covered with a functional surface treatment film including a vapor deposited film.

As a molding material for a primer film, thermoplastic elastomer can be used in consideration of shock resistance. As a hard coat film, a silicone-based material with excellent abrasion resistance can be used.

As a functional surface treatment film, an antireflection film or mirror film formed from a multilayer vapor deposited film is available. An antifogging treatment is preferably further applied to the surface of each of these antireflection and mirror films in advance by forming a water-repellent film or the like.

Examples

The present invention will be described in greater detail with reference to Reference Examples and Examples. Obviously, the present invention is not limited to Examples and can be variously modified within the technical scope of the present invention.

Polarizing sheets in Examples and Reference Examples were prepared in the following manner.

<Preparation of Test Polarizing Sheets>

Each of the following polarizing sheets was subjected to a thermal pressing process (bending process) into a spherical shape by a conventional method (for example, Patent Literature 1 [paragraph 0102]), thereby preparing spherical surface members respectively having a curvature 8 C (curvature radius=66.81 mm) and a curvature 6 C (curvature radius=89.08 mm). Thereafter, the respective members were inverted. More specifically, each member was subjected to a thermal press forming process (bending process) at an anvil set temperature (Example: 100° C., Reference Example: 160° C.), with the first protective layer (TAC layer) 17 being located below the second protective layer (transparent PA layer). Thereafter, unnecessary portions were removed and the resultant structures were inverted to prepare spherical polarizing sheets to be used for injection molding.

Example . . . Polarizing sheet A available from Polatechno Co., Ltd., with specifications: first protective layer (TAC, ν=56): 80 μm, polarizer layer: 30 μm, second protective layer (alicyclic PA, ν=52): 100 μm Reference Example . . . Polarizing sheet B available from Mitsubishi Gas Chemical Company, Inc., with specifications: first protective layer (polycarbonate (PC), ν=30): 300 μm, polarizer layer: 30 μm, second protective layer (PC, ν=30): 300 μm <Preparation of Test Compacts>

Each of the polarizing sheets having the respective inverted spherical shapes was set in a general-purpose injection mold (4-cavity mold), and insert molding of the following materials was respectively performed under the following conditions, thereby preparing polarizable compacts. A conventional antireflection film and an antifogging film like those formed on the polarizable compact (spectacle lenses) proposed by the present applicants were formed on the respective polarizable compacts, thereby preparing test compacts.

Example . . . Molding plastic material: alicyclic PA (the same material as that for the second protective layer), injection temperature: 270° C., mold temperature: 100° C.

Reference Example . . . Molding plastic material: PC (ν=30), injection temperature: 310° C., mold temperature: 100° C.

<Test Methods>

The respective test objects were tested by the following methods.

(1) Retardation Measurement Test

On each prepared polarizing sheet test object after a bending process, Re was measured at 6 points in the vertical direction and 6 points in the horizontal direction at λ: 632.8 nm by using ellipsometer "DVA-36VW-UVIR" available from Mizojiri Optical Industries Co., Ltd, and the arithmetic mean value of the measured values was set as a test result.

(2) Void Test

Void evaluation was performed on the basis of the following criteria by irradiating each polarizing sheet after a bending process with light (ordinarily polarized light) from the direction of the convex surface through another planar polarizing sheet having undergone no bending process and visually observing from the direction of the concave surface of the polarizing sheet.

◎: No void was observed.
○: Slight voids were observed.
x: Voids were observed.

(3) Rainbow Color Unevenness Test

Color unevenness was evaluated on the basis of the following criteria by obliquely visually observing the convex surface of each test polarizable compact.

◎: No rainbow color unevenness was observed.
x: Rainbow color unevenness was observed.

<Test Results•Evaluations>

Measurement results and observation results (Re, color unevenness, and voids) of each polarizing sheet after a bending process will be described and consideration will be added. Table 2 is a summary of the properties of the transparent molding materials and the above measurement and observation results. Table 3 shows the phase differences and the actual measured values (vertical/horizontal) of retardation concerning curvatures 8 C and 6 C.

TABLE 2

| Properties of Transparent Molding Materials | | Unit | Example | Reference Example |
|---|---|---|---|---|
| Density(23° C.) | ISO 1183 | g/cm³ | 1.00 | 1.19 |
| Bending Elastic Modulus | ISO178 | MPa | 1600 | 2300 |
| Abbe Number | | ν | 52 | 30 |
| Test Results | | | | |
| Polarizing Sheet Re (8C) after Bending Process | | nm | Average: 3.9 | Average: 280 |
| Void Test | | Visual Check | ◎ | X |
| Rainbow Color Unevenness Test | | Visual Check | ◎ | X |

TABLE 3

| Curve | Measurement Direction | Phase Difference Δ° | Retardation(nm) | Average Retardation over 6 Points (nm) |
|---|---|---|---|---|
| 8C | Vertical | −3.5 | 6.2 | 2.0 |
| | | 0.0 | 0.1 | |
| | | −2.6 | 4.5 | |
| | | −0.3 | 0.5 | |
| | | 0.3 | 0.5 | |
| | | −0.1 | 0.2 | |
| | Horizontal | −8.6 | 15.1 | 5.8 |
| | | −4.4 | 7.8 | |
| | | −4.4 | 7.8 | |
| | | 0.1 | 0.1 | |
| | | −1.0 | 1.8 | |
| | | −1.4 | 2.4 | |
| 6C | Vertical | 0.0 | 0.0 | 0.1 |
| | | 0.0 | 0.0 | |
| | | 0.0 | 0.0 | |
| | | −0.1 | 0.1 | |
| | | −0.1 | 0.2 | |
| | | −0.1 | 0.1 | |
| | Horizontal | 0.0 | 0.1 | 0.7 |
| | | 0.1 | 0.2 | |
| | | 0.0 | 0.1 | |
| | | −0.4 | 0.7 | |
| | | −1.1 | 2.0 | |
| | | −0.8 | 1.4 | |

(1) Retardation Values (Re) (8 C) . . . Example: About 3.9 nm (Vertical: 2.0 nm, Horizontal: 5.8 nm), Reference Example: 280 nm (Vertical: 180 nm, Horizontal: 380 nm)

In this case, each polarizer layer has undergone a uniaxial stretching process at high magnification (see Literature 2 described above, paragraph 0058). For this reason, it is estimated that observed Re of the polarizing sheet held between the unstretched protective layers according to Example is mainly caused by Re of each polarizer layer. In consideration of vertical Re=5.8 nm of the polarizing sheet (three layers) after a bending process, it is unlikely that Re of the polarizing sheet after a bending process exceeds 10 nm to 5 nm, not to mention 50 nm. Obviously, Re of each protective layer does not exceed 10 nm to 5 nm.

Note that even an unstretched layer exhibits certain birefringence owing to its polymeric molecular structure. In addition, the first protective layer on the convex surface side according to Example is formed from a transparent film that is unstretched (that is, Re is extremely small or near 0) and has a high Abbe number (for example, v=56) like TAC. It is therefore estimated that this layer makes it less likely to cause variations in polarization performance (polarization degree) of the polarizer layer and also almost prevents the occurrence of voids and color unevenness, as will be described later.

(2) Void Test . . . Example: ⊚, Reference Example: x

It was confirmed that the polarizing sheet (after a bending process) according to Example was free from the occurrence of voids in each protective film.

(3) Rainbow Color Unevenness Test . . . Example: ⊚, Reference Example: x

It was confirmed that no color unevenness occurred in the polarizable compact according to Example when observed from obliquely front.

REFERENCE SIGNS LIST

10: polarizable compact
11: polarizing sheet
13: polarizer layer
15: injection-molded portion
17: first protective layer
19: second protective layer

The invention claimed is:

1. A method of manufacturing a polarizable compact used for glasses, comprising
    forming an injection-molded portion from a transparent molding material at an injection temperature of the transparent molding material in the range of 230° C. to 270° C. and at a temperature of a mold used for forming the injection-molded portion in the range of 60° C. to 100° C.;
    thermally bonding the injection-molded portion to a concave surface side of a polarizing sheet having a predetermined curvature radius, the polarizing sheet having a polarizer layer held between a first protective layer and a second protective layer respectively serving as a convex surface side and a concave surface side,
    wherein the first protective layer and the second protective layer are formed from transparent films by a casting method with retardation (Re)≤10 nm, the transparent films of the first protective layer and the second protective layer being formed from an acylcellulose-based plastic film material and a polyamide-based plastic film material, respectively,
    the polarizing sheet is bent to a predetermined curvature by a bending process, which occurs prior to the thermally bonding,
    the second protective layer is directly fused to the injection-molded portion, and
    the polarizing sheet after the bending process has Re≤10 nm.

2. The method according to claim 1, wherein the first protective layer is formed from the transparent film that is not stretched or oriented.

3. The method according to claim 2, wherein the film materials for the transparent films forming the first protective layer and the second protective layer each exhibit Abbe number (v)≥44.

4. The method according to claim 3, wherein the film material for the first protective layer exhibits v≥54 and has a higher Abbe number than the film material for the second protective layer.

5. The method according to claim 1 wherein the injection-molded portion is formed from a polyamide-based transparent molding material identical or akin to the film material for the second protective layer, and
    the transparent molding material exhibits v≥44 and a density (ISO1183) of not more than 1.03 g/cm$^3$.

6. The method according to claim 1 wherein the polarizing sheet is inverted after being bent to a predetermined curvature by a bending process using thermal press forming.

7. The method according to claim 1 wherein a surface on at least one of sides of the polarizable compact is covered with a hard coat film, and the hard coat film is covered thereon with a functional surface treatment film including a vapor deposited film.

8. The method according to claim 2, wherein the injection-molded portion is formed from a polyamide-based transparent molding material identical or akin to the film material for the second protective layer, and
    the transparent molding material exhibits v≥44 and a density (ISO1183) of not more than 1.03 g/cm$^3$.

9. The method according to claim 3, wherein the injection-molded portion is formed from a polyamide-based transparent molding material identical or akin to the film material for the second protective layer, and
    the transparent molding material exhibits v≥44 and a density (ISO1183) of not more than 1.03 g/cm$^3$.

10. The method according to claim 4, wherein the injection-molded portion is formed from a polyamide-based transparent molding material identical or akin to the film material for the second protective layer, and
    the transparent molding material exhibits v≥44 and a density (ISO1183) of not more than 1.03 g/cm$^3$.

11. The method according to claim 2, wherein the polarizing sheet is inverted after being bent to the predetermined curvature by the bending process using thermal press forming.

12. The method according to claim 3, wherein the polarizing sheet is inverted after being bent to the predetermined curvature by the bending process using thermal press forming.

13. The method according to claim 4, wherein the polarizing sheet is inverted after being bent to the predetermined curvature by the bending process using thermal press forming.

14. The method according to claim 5, wherein the polarizing sheet is inverted after being bent to the predetermined curvature by the bending process using thermal press forming.

15. The method according to claim 2, wherein a surface on at least one of sides of the polarizable compact is covered with a hard coat film, and the hard coat film is covered thereon with a functional surface treatment film including a vapor deposited film.

16. The method according to claim 3, wherein a surface on at least one of sides of the polarizable compact is covered with a hard coat film, and the hard coat film is covered thereon with a functional surface treatment film including a vapor deposited film.

17. The method according to claim 4, wherein a surface on at least one of sides of the polarizable compact is covered with a hard coat film, and the hard coat film is covered thereon with a functional surface treatment film including a vapor deposited film.

18. The method according to claim 5, wherein a surface on at least one of sides of the polarizable compact is covered with a hard coat film, and the hard coat film is covered thereon with a functional surface treatment film including a vapor deposited film.

19. The method according to claim 8, wherein a surface on at least one of sides of the polarizable compact is covered with a hard coat film, and the hard coat film is covered thereon with a functional surface treatment film including a vapor deposited film.

\* \* \* \* \*